United States Patent [19]
Burchill et al.

[11] Patent Number: 4,990,369
[45] Date of Patent: Feb. 5, 1991

[54] PROCESS FOR SURFACE MODIFICATION OF POLYMER ARTICLES

[75] Inventors: Michael T. Burchill, Cranbury; Maryam Rafiei, Bayonne; Joseph Silbermann, Old Bridge, all of N.J.

[73] Assignee: M&T Chemicals Inc., Woodbridge, N.J.

[21] Appl. No.: 410,760

[22] Filed: Sep. 22, 1989

Related U.S. Application Data

[63] Continuation of Ser. No. 338,337, Apr. 3, 1989, abandoned, which is a continuation of Ser. No. 209,750, Jun. 21, 1988, abandoned, which is a continuation-in-part of Ser. No. 945,595, Dec. 23, 1986, Pat. No. 4,770,905.

[51] Int. Cl.$^5$ .................. B05D 5/00; B05D 1/18
[52] U.S. Cl. .................. 427/160; 427/331; 427/336; 427/353; 427/377; 427/398.3; 427/421; 427/424; 427/430.1; 427/434.2
[58] Field of Search .............. 427/160, 331, 336, 353, 427/377, 398.3, 421, 424, 430.1, 434.2

[56] References Cited

U.S. PATENT DOCUMENTS

| | | | |
|---|---|---|---|
| 3,043,709 | 7/1962 | Amborski | 427/160 |
| 3,192,074 | 6/1965 | Newhard, Jr. | 148/6.14 |
| 3,297,462 | 1/1967 | Fanning | 427/160 |
| 3,309,220 | 3/1967 | Osteen | 117/33.3 |
| 3,519,462 | 7/1970 | Christian | 427/160 |
| 3,594,264 | 7/1971 | Urban | 161/168 |
| 3,617,330 | 11/1971 | Peilstocker | 117/33.3 |
| 3,656,991 | 4/1972 | Blackwell et al. | 427/160 |
| 3,783,011 | 1/1974 | Chauffoureaux | 427/160 |
| 3,892,889 | 7/1975 | Cohnen et al. | 117/33.3 |
| 4,126,660 | 11/1978 | Lemkowicz et al. | 264/101 |
| 4,129,667 | 12/1978 | Lorenz et al. | 427/44 |
| 4,146,658 | 3/1979 | Humphrey | 427/160 |
| 4,322,455 | 3/1982 | Olson et al. | 427/160 |
| 4,323,597 | 5/1982 | Chilton | 427/160 |
| 4,349,602 | 9/1982 | Ching | 428/331 |
| 4,349,607 | 9/1982 | Ching | 428/412 |
| 4,353,959 | 10/1982 | Olson et al. | 428/331 |
| 4,382,109 | 5/1983 | Olson et al. | 428/331 |
| 4,396,678 | 8/1983 | Olson | 428/412 |
| 4,439,494 | 3/1984 | Olson | 428/412 |
| 4,556,606 | 12/1985 | Olson | 428/412 |
| 4,636,408 | 1/1987 | Anthony et al. | 427/160 |
| 4,868,011 | 9/1989 | Burchill et al. | 427/160 |

FOREIGN PATENT DOCUMENTS

| | | |
|---|---|---|
| 134523 | 3/1985 | European Pat. Off. . |
| 151961 | 8/1985 | European Pat. Off. . |
| 2808005 | 8/1979 | Fed. Rep. of Germany . |
| 2808036 | 8/1979 | Fed. Rep. of Germany . |

OTHER PUBLICATIONS

Katz et al., "Ultraviolet Protection of Transparent PVC Sheets by Diffusion Coatings", Div. Org. Coatings & Plastics, 36(1), pp. 202–206, 1976.

*Primary Examiner*—Janyce Bell
*Attorney, Agent, or Firm*—Finnegan, Henderson, Farabow, Garrett & Dunner

[57] ABSTRACT

An improvement in the process of incorporating a modifier igredient into the surface region of a resinous article is described herein. The basic process includes immersing the article in a liquid such as water and contacting the immersed article with a solution of a modifier ingredient in a solvent which is immiscible with the liquid. The improvement herein comprises running the process at a temperature lower than ambient or room temperature whereat substantially no solid material is formed on the surface of the water layer during the process.

19 Claims, No Drawings

PROCESS FOR SURFACE MODIFICATION OF POLYMER ARTICLES

CROSS-REFERENCE TO RELATED PATENT APPLICATIONS

This application is a continuation of application Ser. No. 338,337, filed Apr. 13, 1989, now abandoned, which is a continuation of application Ser. No. 209,750, filed June 21, 1988, now abandoned, which is a continuation-in-part application of Ser. No. 945,595, filed Dec. 23, 1986, now U.S. Pat. No. 4,770,905.

BACKGROUND OF INVENTION

1. Field of Invention

This invention relates to surface modified resinous articles, and processes for making same, and more particularly, to an improved method for making said articles in a continuous manner.

2. Description of Prior Art

In the aforesaid copending patent application, there is described a method of incorporating a modifier ingredient such as a UV absorber into the surface region of a resinous body such as a PVC sheet. The method includes the steps of: (1) immersing the body in a liquid such as water, and (2) contacting the immersed body with a solution of the modifier ingredient in a solvent such as methylene chloride which is immiscible with the liquid and which will swell the surface of the resin to allow the solution to enter its surface region.

In the continuous mode of practicing this process, the solution is present as a lower layer, water is the upper layer, a continuous polymer sheet article is transported through the water, and the solution is pumped from the lower layer to the upper layer and directed onto the top surface of the sheet for a predetermined contact time during which the modifier ingredient is incorporated into the contacted surface. After the solution is applied, a jet of water is directed onto the treated surface to displace any residual solution remaining thereon.

When this process is run for an extended period at room temperature, however, it is observed that a solid precipitate of UV stabilizer accumulates on the surface of the water layer. This solid material circulates through the system and tends to clog the pumping and piping equipment used for applying the solution to the resin surface, and for displacing residual solution thereon.

While suitable filters and/or skimmers may be used in the system to remove solid material floating on the surface of the water layer, such techniques require relatively costly equipment and periodic maintenance.

Accordingly, it is an object of the present invention to provide a method for preventing the accumulation of solid precipitate material on the surface of the water layer in the underwater process of the aforesaid patent application.

A more particular object herein is to provide a physical method of substantially eliminating the problem of solid formation on the surface of the water layer in such process.

A feature of the invention is the operation of the process at a temperature lower than ambient or room temperature whereat substantially no solid material is formed on the surface of the water layer.

These and other objects and features of the invention will be made apparent from the following more particular description thereof.

SUMMARY OF THE INVENTION

An improvement in the process of incorporating a modifier ingredient into the surface region of a resinous article is described herein. The basic process includes immersing the article in a liquid such as water and contacting the immersed article with a solution of a modifier ingredient in a solvent which is immiscible with the liquid. The improvement herein comprises running the process at a temperature lower than ambient or room temperature whereat substantially no solid material is formed on the surface of the water layer during the process.

DETAILED DESCRIPTION OF THE INVENTION

It is observed in the aforementioned surface modification process that a droplet or bubble forms at the interface between the water and modifier solution layers which floats to the surface of the water layer. While on the water surface, the solvent, e.g. methylene chloride, in the bubble can evaporate leaving solid modifier, e.g. a U.V. stabilizer, on the surface.

In this invention, it has been discovered that running the process at a temperature below ambient or room temperature will result in a substantial elimination of solid precipitation on the water surface. Preferably, both the water and modifier solution layers are cooled to the desired temperature. Generally, the process is run at 13° C. or below, preferably at about 10° C.

The invention will be illustrated by reference to the following examples.

EXAMPLE 1

In a laboratory experiment which illustrates the principle of the invention, a solution of 60 g of solid ultraviolet light stabilizer, e.g. Cyasorb UV 5411 (Trademark of American Cyanamid Co.) dissolved in 300 ml of methylene chloride, was added to a 4 l bell jar and covered with a 3 l blanket of tap water at 20° C. A peristaltic pump was used to pump the solution from the lower solution layer to and through the upper water layer. Pumping of solution was continued for 90 minutes. Solid stabilizer was observed to precipitate on the surface of the water; it was collected, dried and weighed. 2.0 g of solid material was obtained.

EXAMPLE 2

The procedure above was followed except that the temperature of the solution and water layers were cooled below 20° C. After the process was run for 90 minutes, the solid material was collected, dried and weighed. The results are shown in the Table below.

TABLE

| Temp (°C.) | Amount Precipitate collected (g) |
|---|---|
| 20° | 2.0 |
| 19° | 2.0 |
| 13° | 0.5 |
| 13° | 0.45 |
| 10° | 0.01 |

These results show that lowering the temperature of the water and solution layers is a particularly effective method for substantially eliminating the problem of formation of solid material on the surface of the water layer during the underwater impregnation process.

While the invention has been described with particular reference to certain embodiments thereof, it will be understood that changes and modifications may be made which are within the skill of the art. Accordingly, it is intended to be bound only by the claims which follow.

We claim:

1. A process of incorporating a modifier ingredient into the surface region of a resinous article comprising the steps of:
    (a) immersing a resinous article in a water;
    (b) contacting the immersed article with a solution of a modifier ingredient in a solvent and
    (c) conducting the process at a temperature of about 13° C. or lower.

2. A process according to claim 1 wherein said temperature is about 10° C.

3. A process according to claim 1 wherein said modifier ingredient is a solid ultraviolet light stabilizer.

4. A process according to claim 1 wherein said solvent is methylene chloride.

5. A process according claim 1 wherein both said water and modifier solution are cooled to said desired temperature.

6. The process according to claim 1, wherein said temperature is sufficiently low to prevent solid modifier material from depositing and accumulating on the surface of said liquid.

7. The process according to claim 1, wherein said resin in said resinous article is polyvinyl chloride.

8. The process according to claim 1, wherein said resinous article is in the form of a sheet.

9. A process of incorporating a modifier ingredient into the surface region of a resinous article comprising the steps of:
    (a) immersing a resinous article in a water;
    (b) contacting the immersed article with a solution of a modifier ingredient in a solvent; and
    (c) conducting the process at a temperature lower than ambient temperature.

10. The process according to claim 9, wherein the liquid is water and said solution is methylene chloride.

11. The process according to claim 9, wherein the resin in said resinous article is polyvinyl chloride.

12. A process of incorporating an ultraviolet light stabilizer into the surface region of a resinous article comprising the steps of:
    (a) immersing a resinous article in water;
    (b) contacting the immersed article with a solution of the ultraviolet light stabilizer in a solvent; and
    (c) conducting the process at a temperature lower than ambient temperature.

13. The process of claim 12, wherein the solvent is methylene chloride.

14. The process according to claim 13, wherein said resin in said resinous article is polyvinyl chloride.

15. The process according to claim 14, wherein said resinous article is in the form of a sheet.

16. The process according to claim 14, wherein said temperature is about 13° C. or lower.

17. The process according to claim 12, wherein said temperature is about 13° C. or lower.

18. The process according to claim 12, wherein said temperature is about 10° C.

19. The process according to claim 12, wherein said temperature is sufficiently low to prevent said ultraviolet light stabilizer from depositing and accumulating on the surface of the liquid.

* * * * *

UNITED STATES PATENT AND TRADEMARK OFFICE
CERTIFICATE OF CORRECTION

PATENT NO. : 4,990,369

DATED : February 5, 1991

INVENTOR(S) : Michael T. BURCHILL, Maryam RAFIEI, Joseph SILBERMANN

It is certified that error appears in the above-identified patent and that said Letters Patent is hereby corrected as shown below:

TITLE PAGE:
In the Abstract, line 2, "igredient" should be
   --ingredient--.

Claim 10, col. 4, line 9, "the" should be --said--.

Claim 12, col. 4, line 18, "the" should be --an--.

Claim 14, col. 4, line 23, "said" should be --the--.

Signed and Sealed this

Thirtieth Day of June, 1992

Attest:

DOUGLAS B. COMER

Attesting Officer     Acting Commissioner of Patents and Trademarks